United States Patent [19]
Bruncher et al.

[11] Patent Number: 5,268,013
[45] Date of Patent: Dec. 7, 1993

[54] FILTRATION DEVICE IN THE FORM OF A ONE-PART CARTRIDGE INTENDED FOR PYROTECHNIC GENERATORS

[75] Inventors: Bernard Bruncher, Pair et Grandrupt; Philippe Chretien, St. Jean D'Ormont; Christian B. Perotto, Ballancourt, all of France

[73] Assignees: S.N.C. Livbag, Vert-Le-Petit; Société Anonyme des Etablissements Gantois, Saint Die, both of France; a part interest to each

[21] Appl. No.: 837,481

[22] Filed: Feb. 18, 1992

[30] Foreign Application Priority Data

Feb. 22, 1991 [FR] France ............... 91 02315

[51] Int. Cl.$^5$ ............................... B01D 46/24
[52] U.S. Cl. ............................ 55/486; 55/487; 55/498; 280/741; 422/164
[58] Field of Search ............ 55/486, 487, 498; 280/728, 736, 740, 741; 422/164, 305

[56] References Cited

U.S. PATENT DOCUMENTS

| | | | |
|---|---|---|---|
| 1,639,132 | 8/1927 | Greene | 55/491 |
| 3,985,076 | 10/1976 | Schneiter et al. | 280/741 |
| 4,012,211 | 3/1977 | Goetz | 422/164 |
| 4,547,342 | 10/1985 | Adams et al. | 422/305 |
| 4,865,635 | 9/1989 | Cuevas | 55/487 |
| 4,943,086 | 7/1990 | Cunningham | 102/39 |
| 5,106,119 | 4/1992 | Swann et al. | 280/731 |

FOREIGN PATENT DOCUMENTS

| | | |
|---|---|---|
| G9006600 | 10/1990 | Fed. Rep. of Germany . |
| G9013130 | 1/1991 | Fed. Rep. of Germany . |
| 2624398 | 6/1989 | France . |
| 2213404 | 8/1989 | United Kingdom . |

*Primary Examiner*—Charles Hart
*Attorney, Agent, or Firm*—Weiser & Associates

[57] ABSTRACT

Gas-filter in the form of an axisymmetric one-part cartridge (1), characterised in that it is essentially constituted by:

a) a rigid ring (2) comprising an axisymmetric lateral wall (21) bounded by a flat-forming extremity (23) and by another, fold-down extremity (24), openings (22) being disposed on the wall (21) between the extremities (23) and (24), b) a gas-impermeable backing piece (3) surrounding on the outside the lateral wall (21) of the ring (2) by bearing on the plane extremity (23) of the ring (2) and crimped into the fold-down extremity (24) of the ring (2), c) filter elements (4) disposed between the ring (2) and the backing piece (3).

27 Claims, 2 Drawing Sheets

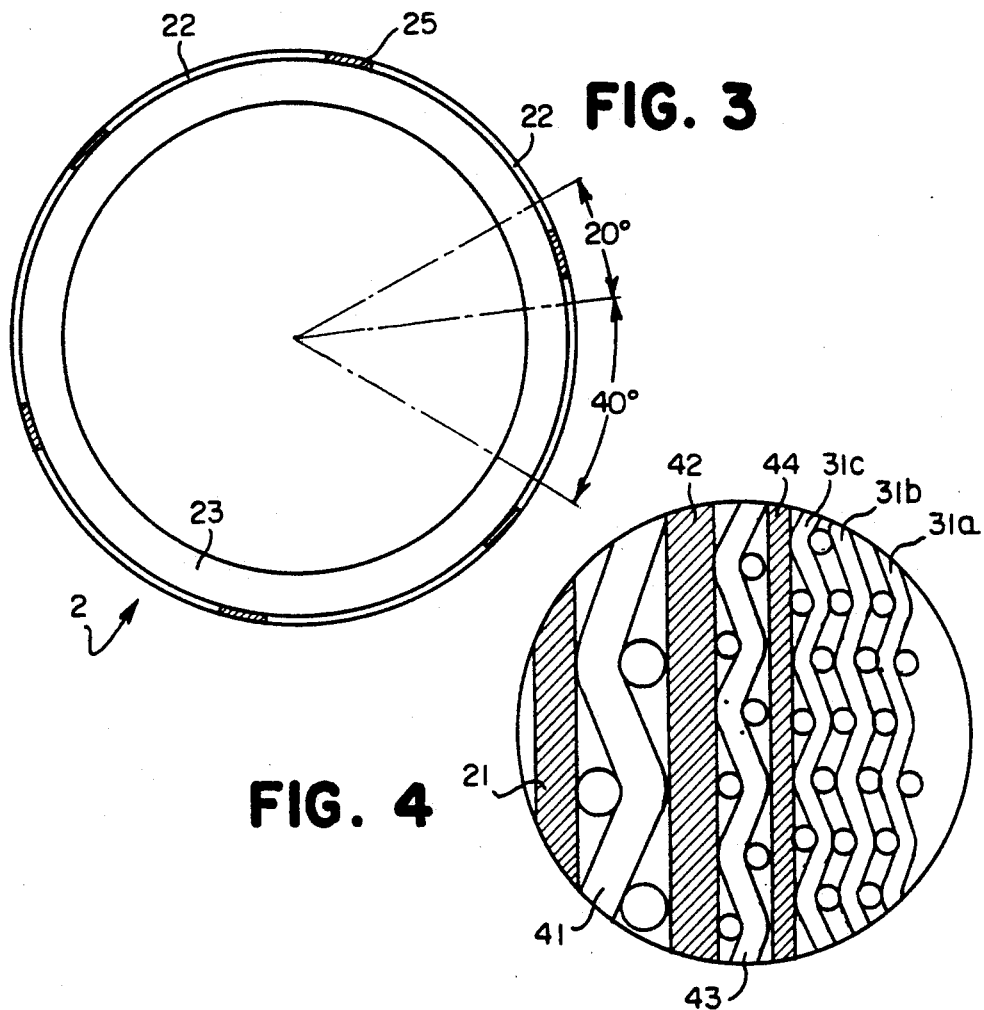
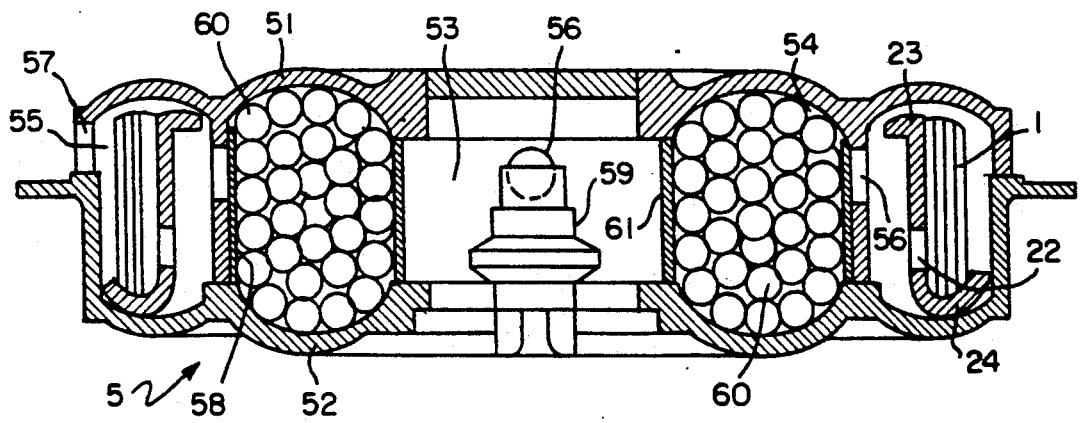

FILTRATION DEVICE IN THE FORM OF A ONE-PART CARTRIDGE INTENDED FOR PYROTECHNIC GENERATORS

The present invention relates to the field of impact protection of the occupants of a motor vehicle by means of a cushion which can be inflated by gases produced by a pyrotechnic gas generator connected to a collision detector.

More precisely, the invention relates to a filtration device in the form of a one-part cartridge intended for such pyrotechnic generators.

The impact protection of the occupants of a motor vehicle, in the event of collision, by means of an inflatable cushion requires a very rapid inflation of the cushion.

In order to meet the standards of automotive safety it is necessary to inflate the protective cushion in a time between 30 and 60 milliseconds after detecting the collision.

In order to reliably meet this requirement, pyrotechnic gas generation proves to be particularly well suited. Pyrotechnic gas generators have therefore been developed which, by combustion of a suitable composition, supply in a very short time a large volume of gas. For obvious safety reasons it is preferable for the gases thus produced to be essentially inert, which has lead the person skilled in the art to favour pyrotechnic compositions based on an inorganic nitride and on an inorganic oxidising agent which, by combustion, supply mainly nitrogen. However, the gases thus produced contain traces of toxic compounds such as carbon monoxide or certain oxides of nitrogen, the amount of which it is desirable to lower before leaving the generator, but above all they entrain with them hot solid particles which it is absolutely necessary to prevent entering into the inflatable cushion if correct operation of the latter is to be guaranteed.

It is therefore essential to filter mechanically, and if possible chemically, the gases emanating from the combustion of the pyrotechnic composition, this filtration leading, moreover, to a cooling of the gases which is necessary for ensuring the safety of the occupant of the vehicle in contact with the cushion.

In order to achieve this, pyrotechnic generators conventionally comprise at least one combustion chamber containing the pyrotechnic composition and a filter chamber containing filter elements.

An array of metal mesh screens of greater or lesser mesh size, or indeed even of metal gauzes, are normally used as filter elements. Examples of such filter devices are described, for example, in U.S. Pat. Nos. 3,985,076, 4,547,342 or FR 2,624,398. As is described in the above-mentioned patents, the chambers of the generator are normally concentric in order to facilitate the operations for assembling the generator, the combustion chamber being medial or central and the filter chamber being a peripheral annular chamber, the body of the generator being constituted by a bottom and a cover which are solidly fixed to each other.

Under these conditions, the installation, during mounting of the generator, of various separate mesh screens or gauzes in the filter chamber and their holding in place, while the cover has not been fixed to the bottom of the generator, is a tricky operation which does not lend itself well to the automating of the manufacture of the generators and which considerably increases the manufacturing cost thereof.

Now, it should be understood that the question of the cost price is essential in the field of automotive safety since vehicle manufacturers are constantly seeking to lower the costs of the various components.

There has already been proposed, by U.S. Pat. No. 4,865,635, a filter device in the form of a one-part annular cartridge which is easy to install in the generator during mounting and which, as a result, permits a rational automation of the operations for assembling the generator.

However, the cartridge proposed by U.S. Pat. No. 4,865,635 is itself a complex structure. This cartridge is constituted by two rigid rings partially fitted into each other in such a manner as to grip around a first set of filtering mesh screens, this assembly being itself surrounded by a second set of mesh screens, the various constituent elements being solidly connected by means of a complex system of intermediate welds. If the solution proposed by U.S. Pat. No. 4,865,635 well enables the assembly of the generator to be simplified, it transfers the previously mentioned difficulties to the production of the filter cartridge and does not enable the manufacturing costs to be substantially lowered. Moreover, this filter cartridge is not perfectly rigid by virtue of its very make-up requiring the use of two rings, partially fitted into each other, and thereby does not have excellent mechanical properties. Now, during operation the gas generator experiences a rapid rise in pressure which all the mechanical elements which it contains must withstand. This type of carridge therefore does not have completely satisfactory operation in terms of safety.

The person skilled in the art does not have available therefore, at the present time, a device for filtering the gases which is both simple to produce, easy to install in the generator and which has mechanical properties which fully satisfy the demands imposed by automotive safety standards.

The object of the present invention is precisely to propose such a device. The invention therefore relates to a gas-filter device in the form of an axisymmetric one-part cartridge characterised in that it is essentially constituted by:

a) a rigid ring comprising an axisymmetric lateral wall bounded by a flat-forming extremity and by another, fold-down extremity, openings being disposed on the said lateral wall, b) a gas-permeable backing piece surrounding on the outside the said lateral wall of the ring, by bearing on the said plane extremity, and crimped into the fold-down extremity of the ring, c) filter elements disposed between the ring and backing piece.

According to a first preferred embodiment of the invention, the backing piece is constituted by at least one metal mesh screen rolled up on itself, welded along a generatrix and folded around the plane extremity of the ring. Again, preferably, this metal mesh screen is folded along a folding line disposed at 45° in relation to the wires constituting its grid pattern.

According to a second preferred embodiment, the openings of the lateral wall of the said ring are disposed, in the vicinity of the fold-down extremity, in such a manner that the portion of the lateral wall located in the vicinity of the flat-forming extremity is solid.

The invention also relates to a process for manufacturing a cartridge according to the invention, characterised in that the said filter elements are disposed around the outer surface of the lateral wall of the ring, then in that the backing piece is installed in such a manner that it bears on the plane extremity of the ring and in that the backing piece and the ring are rendered solidly connected by crimping the backing piece into the fold-down extremity of the ring.

Finally, the invention also relates to the use of such a cartridge in a pyrotechnic gas generator having concentric chambers comprising at least one combustion chamber and one peripheral annular filter chamber which are separated by a wall provided with communication orifices. The cartridge is preferably disposed in the filter chamber in such a manner that the solid portion of the lateral wall of the ring is located opposite the said communication orifices.

The invention thus permits a one-part cartridge to be used for filtering the gases which is simple to manufacture, which is placed easily into a pyrotechnic gas generator during mounting and which has excellent mechanical properties because all the constituent elements of the cartridge are held and borne by a single rigid ring which renders the whole structure undeformable.

The invention is now described in detail by referring to FIGS. 1 to 6.

FIG. 3 is a sectional view according to the plane A—A of the constituent ring of the cartridge shown in FIG. 2.

FIG. 4 is an enlargement of the portion indicated by the reference L of the cartridge shown in FIG. 2, in such a manner as to show clearly the arrangement of the various mesh screens and gauzes around the ring.

FIG. 6 is a sectional view of a generator having concentric chambers, containing a filter cartridge according to the invention.

Figure 1:
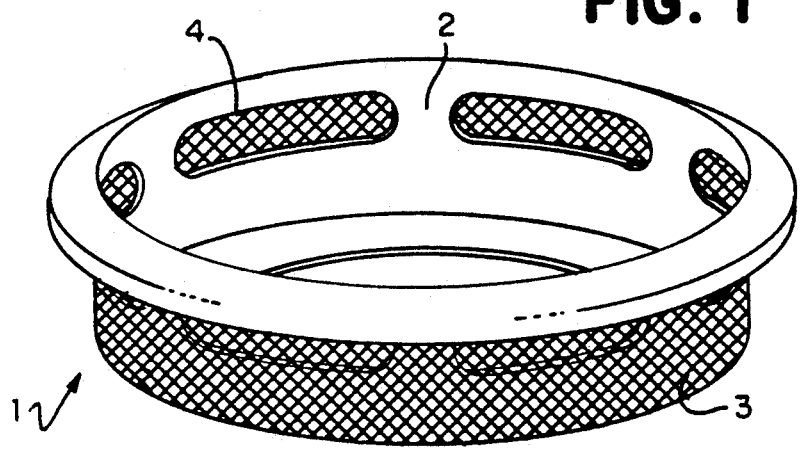
FIG. 1 is a perspective view of a filter cartridge according to the invention.
Figure 2:
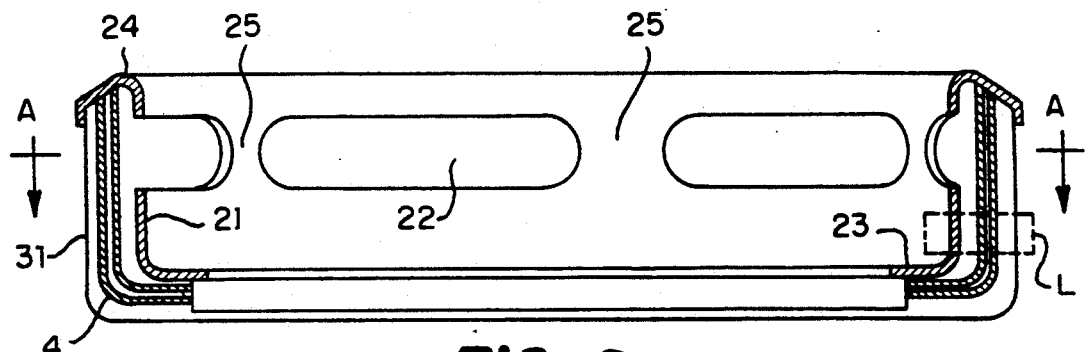
FIG. 2 is a sectional view according to a plane of axial symmetry of the cartridge shown in FIG. 1.

Referring more particularly to FIGS. 1 and 2, it is observed that a gas-filter device according to the invention has the shape of an axisymmetric one-part cartridge 1 having an annular general shape.

This cartridge 1 is constituted from a rigid ring 2 comprising an axisymmetric lateral wall 21 bounded by a flat-forming plane extremity 23 and by another fold-down extremity 24.

The flat 23 is preferably oriented towards the inside of the cartridge as shown in the figures. Openings 22 are disposed all around the wall 21 between the said extremities 23 and 24. These openings 22 preferably have a height less than the height of the wall 21 and are disposed, in the vicinity of the fold-down extremity 24, in such a manner that the portion of the lateral wall 21 situated in the vicinity of the flat 23 is solid.

The benefit of this configuration will be explained later in the description.

It is essential for the ring 2 to be perfectly rigid under the conditions of use of the cartridge and, for this reason, it is recommended that the ring 2 be made from metal. So as to limit the weight of the cartridge, it will be preferable for the rings to be made from aluminium or from aluminium-based alloys.

A second essential element of a cartridge according to the invention consists of a gas-permeable outer backing piece 3 which surrounds the outside of the lateral wall 21 of the ring 2 by bearing on the plane extremity 23 of the ring 2 and which, when the cartridge is finished, is crimped into the fold-down extremity 24 of the ring 2.

So as to guarantee a good impermeability of the cartridge during operation, the portion of the backing piece 3 bears on the plane portion 23.

Figure 5:
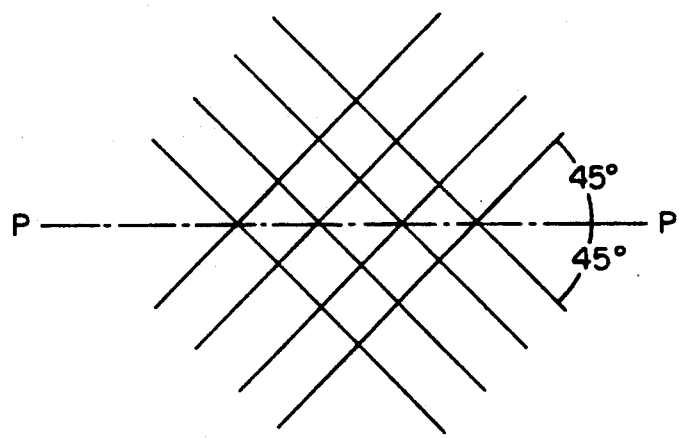
FIG. 5 is a diagram showing the principle of the folding of the outer mesh screen constituting the backing piece.

According to a preferred embodiment of the invention, the backing piece 3 is constituted by at least one metal mesh screen 31 which surrounds the outside of the lateral wall 21 of the ring 2 and which is folded in such a manner as to cover the plane portion 23 in order to ensure the impermeability. So as to ensure a smooth outer surface of the cartridge in the folding zone, the mesh screen 31 is disposed around the ring 2 in such a manner that the folding line PP is disposed at 45° in relation to the wires constituting its grid pattern, as shown in FIG. 5.

Between the lateral wall 21 of the ring 2 and the outer backing piece 3 are disposed filter elements 4.

These filter elements are mainly constituted by a plurality of metal mesh screens. In order to improve the quality of the filtration of the gases it is recommended to insert at least one metal felt between the mesh screens.

The said filter elements will also advantageously contain, moreover, at least one sheet of ceramic paper. The ceramic paper has the advantage in effect of operating as a "thermal sink" and in substantially lowering the temperature of the gases emanating from the combustion of the pyrotechnic composition.

An enlargement has been shown in FIG. 4 of the filter zone of a cartridge according to the invention, comprising, from the inside outwards, the lateral wall 21 of the ring 2, a first, mesh screen 41 made from aluminium, a felt 42 made from "BEKIPOR" stainless steel, a second mesh screen 43 made from stainless steel, finer than the mesh screen 41, a sheet 44 made from ceramic paper and, finally, three fine mesh screens 31c, 31b, and 31a made from stainless steel which together constitute the backing piece 3.

The filter elements, being constituted by flexible gauzes or mesh screens, may either be of the same height as the lateral wall 21 and be simply held by the backing piece 3 which, in this case, only bears on the plane portion 23 of the ring 2 or be of a greater height and be folded as the mesh screen 31 in such a manner that they also bear on the plane portion 23 as shown in FIG. 2. In the latter case, the filter elements bear on the plane portion 23, thus improving the gas impermeability.

So as to ensure correct operation of the filter elements, it is important for the openings 22 to be distributed all around the lateral wall 21 of the ring 2. The cross-section shown in FIG. 3 shows a ring 2 comprising six openings 22 and six connecting branches 25. The angle at the centre corresponding to an opening 22 is 40° whereas that corresponding to a connecting branch is only 20°.

The manufacture of a filter cartridge according to the invention is particularly easy. The various filter elements are disposed around the outer surface of the lateral wall 21 of the ring 2 and optionally folded in such a manner as to bear on the plane portion 23 of the ring 2. Then the backing piece 3 is installed in such a manner as to bear on the said plane extremity 23. Subsequently, to finish, the backing piece 3 is rendered solidly connected to the ring 2 by crimping the backing piece into the fold-down extremity 24 of the ring 2. This is a succession of operations which may all be automated.

The cartridge thus constituted has a rigidity and therefore mechanical properties which are ideal in so far as all the constituent elements of the cartridge are borne and held in place by a single rigid mechanical part: the ring 2.

The filter cartridges according to the invention are preferably used in pyrotechnic gas generators having concentric chambers, comprising at least one combustion chamber and one peripheral annular filter chamber, the two chambers communicating with each other via orifices.

Such a generator 5 has been shown in cross-section in FIG. 6. The body of the generator is axisymmetric and is composed of a bottom 52 and a cover 51 which are fixed to each other, for example by welding. The bottom and the cover are axisymmetric and comprise circular internal walls which may or may not come into contact with each other and which define, after assembling the bottom and the cover, three concentric chambers: a central chamber 53 intended to receive an igniter 59, a medial chamber 54 intended to receive the gas-generating pyrotechnic composition 60 and a peripheral annular chamber 55 intended to receive the device for filtering the gases.

In the case of the generator shown in FIG. 6, the chamber 53 and the chamber 54 are separated by a partition 61 borne by the cover 51 and by the bottom 52 whereas the combustion chamber 54 is separated from the filter chamber 55 by a continuous partition 58 bearing orifices 56. Moreover, the cover 51 of the generator communicates with the outside via orifices 57. Such a generator is described in detail in French Patent Application 89/08989, which corresponds to U.S. Pat. No. 5,139,220 entitled "Cold-Gas Pyrotechnic Generator". A cartridge 1 according to the invention is easily placed into the bottom 52 of the generator during mounting and does not require any particular precaution in order to be held in place as the cover 51 is not fixed to the bottom 52.

The installation of the filter device may thus be very easily automated.

When the cartridge 1 corresponds to the preferred embodiment of the invention, according to which the openings 22 are disposed in the vicinity of the fold-down extremity 24 of the lateral wall 21 of the ring 2, in such a manner that the portion of this wall which is located in the vicinity of the flat 23 is solid, the cartridge 1 will be advantageously placed into the bottom 52 in such a manner that this solid portion is located opposite the communication orifices 56 between the filter chamber 55, as shown in FIG. 6. With this disposition of the cartridge, during operation of the generator, the combustion gases emanating from the chamber 54 via the orifices 56 come up against the solid portion of the wall 21 of the ring 2 which acts as a baffle and lengthens the path of the gases in the filter chamber. In the configuration shown in FIG. 6, the gases emanating from the orifices 56 come up against the solid portion of the wall 21 of the cartridge 1, going down the length of the cartridge in order to penetrate via the orifices 22, and are obliged to traverse the cartridge 1 over its entire height in order to exit the generator via the orifices 57. This effect is further improved when the flat 23 is oriented towards the inside of the cartridge.

At all events, the height of the cartridge must correspond exactly to the height of the filter chamber in such a manner as to ensure perfect impermeability along the surfaces of contact between the cartridge 1, and the cover 51 on the one hand, and the bottom 52 on the other hand.

We claim:

1. A gas-filtering device formed as an axisymmetrical, unitary cartridge and comprising:
   a rigid ring including an axisymmetrical lateral wall terminating in first and second flanged ends, and a plurality of openings formed in the lateral wall and positioned between the first and second flanged ends;
   a gas-permeable backing piece overlying the lateral wall and terminating in first and second edge portions, wherein first edge portions of the backing piece are in contact with a first flanged end of the rigid ring and second edge portions of the backing piece are crimped to a second flanged end of the rigid ring; and
   filter elements enclosed between the rigid ring and the backing piece.

2. The device of claim 1 wherein the backing piece is comprised of at least one metal mesh screen.

3. The device of claim 2 wherein the metal mesh screen includes a fold extending around the first flanged end of the rigid ring.

4. The device of claim 3 wherein the metal mesh screen is formed of a series of wires constituting a grid pattern, and wherein the fold of the metal mesh screen is formed at an angle to the wires constituting the grid pattern.

5. The device of claim 4 wherein the angle is about 45 degrees.

6. The device of claim 1 wherein the first flanged end extends inwardly from the lateral wall.

7. The device of claim 6 wherein the second flanged end extends outwardly from the lateral wall.

8. The device of claim 1 wherein the filter elements include a plurality of metal mesh screens.

9. The device of claim 8 wherein the filter elements further include at least one metal felt.

10. The device of claim 8 wherein the filter elements further include at least one sheet of ceramic paper.

11. The device of claim 1 wherein the filter elements are in contact with the first flanged end of the rigid ring.

12. The device of claim 1 wherein the plurality of openings are positioned between the first and second flanged ends so that the openings are closer to the second flanged end than to the first flanged end.

13. The device of claim 12 wherein the plurality of openings are positioned between the first and second flanged ends so that solid wall portions are closer to the first flanged end than to the second flanged end.

14. The device of claim 1 wherein the plurality of openings are uniformly distributed around the lateral wall.

15. The device of claim 14 having six openings uniformly distributed around the lateral wall.

16. The device of claim 15 wherein each of the plurality of openings extends around the lateral wall for about 40 degrees.

17. The device of claim 16 wherein each of the plurality of openings are separated by solid connecting portions which extend around the lateral wall for about 20 degrees.

18. A pyrotechnic gas generator comprising a bottom and a cover assembled to form concentric chambers including at least one centrally disposed combustion chamber in communication with a peripheral annular filter chamber, wherein the combustion chamber and the filter chamber are separated by a continuous partition incorporating a plurality of orifices for connecting the chambers, and wherein the annular filter chamber contains a gas-filtering device formed as an axisymmetrical, unitary cartridge and including a rigid ring having an axisymmetrical lateral wall terminating in first and second flanged ends, and a plurality of openings formed in the lateral wall and positioned between the first and second flanged ends, a gas-permeable backing piece overlying the lateral wall and terminating in first and second edge portions, wherein first edge portions of the backing piece are in contact with a first flanged end of the rigid ring and second edge portions of the backing piece are crimped to a second flanged end of the rigid ring, and filter elements enclosed between the rigid ring and the backing piece.

19. The pyrotechnic gas generator of claim 18 wherein the gas-filtering device is received within the filter chamber so that solid portions of the lateral wall of the rigid ring are located opposite to the plurality of orifices connecting the combustion chamber and the filter chamber.

20. The pyrotechnic gas generator of claim 18 wherein the gas-filtering device has a height which corresponds to the height of the filter chamber which receives it.

21. A gas-filtering device formed as an axisymmetrical, unitary cartridge and consisting essentially of:
  a rigid ring including an axisymmetrical lateral wall terminating in first and second flanged ends, and a plurality of openings formed in the lateral wall and positioned between the first and second flanged ends;
  a gas-permeable backing piece overlying the lateral wall and terminating in first and second edge portions, wherein first edge portions of the backing piece are in contact with a first flanged end of the rigid ring and second edge portions of the backing piece are crimped to a second flanged end of the rigid ring; and
  filter elements enclosed between the rigid ring and the backing piece.

22. A process for manufacturing a gas-filtering device, comprising the steps of:
  forming a rigid ring with an axisymmetrical lateral wall terminating in first and second flanged ends, and with a plurality of openings in the lateral wall and positioned between the first and second flanged ends;
  positioning a plurality of filter elements around outer surface portions of the lateral wall of the rigid ring;
  placing a gas-permeable backing piece terminating in first and second edge portions over the filter elements and the lateral wall of the rigid ring so that first edge portions of the backing piece are in contact with a first flanged end of the rigid ring, and crimping second edge portions of the backing piece to a second flanged end of the rigid ring, forming an axisymmetrical, unitary cartridge.

23. The process of claim 22 which further comprises the step of folding the first edge portions of the backing piece around the first flanged end of the rigid ring.

24. The process of claim 23 wherein the backing piece is a metal mesh screen formed of a series of wires constituting a grid pattern, and which further comprises the step of folding the first edge portions of the backing piece at an angle to the wires constituting the grid pattern.

25. The process of claim 24 wherein the angle is about 45 degrees.

26. The process of claim 22 wherein the first flanged end is directed inwardly from the lateral wall.

27. The process of claim 26 wherein the second flanged end is directed outwardly from the lateral wall.

* * * * *